US012640610B2

(12) United States Patent
Kumada et al.

(10) Patent No.: US 12,640,610 B2
(45) Date of Patent: May 26, 2026

(54) STATOR FOR ROTATING ELECTRIC MACHINE AND ROTATING ELECTRIC MACHINE

(71) Applicant: HITACHI ASTEMO, LTD., Hitachinaka (JP)

(72) Inventors: Yuki Kumada, Hitachinaka (JP); Kenichi Nakayama, Hitachinaka (JP); Satoshi Yamamura, Hitachinaka (JP); Zhi Jing, Hitachinaka (JP); Mohdbasir Zulaika, Hitachinaka (JP); Akihito Toya, Hitachinaka (JP); Akira Toba, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 211 days.

(21) Appl. No.: 18/559,851

(22) PCT Filed: Feb. 15, 2022

(86) PCT No.: PCT/JP2022/005934
§ 371 (c)(1),
(2) Date: Nov. 9, 2023

(87) PCT Pub. No.: WO2022/254806
PCT Pub. Date: Dec. 8, 2022

(65) Prior Publication Data
US 2024/0250571 A1     Jul. 25, 2024

(30) Foreign Application Priority Data
May 31, 2021     (JP) ................................. 2021-091827

(51) Int. Cl.
*H02K 3/28*          (2006.01)
*H02K 1/16*          (2006.01)

(52) U.S. Cl.
CPC ................. *H02K 3/28* (2013.01); *H02K 1/16* (2013.01); *H02K 2203/06* (2013.01)

(58) Field of Classification Search
CPC ........ H02K 3/04; H02K 3/12; H02K 15/0421; H02K 15/0643
(Continued)

(56) References Cited

U.S. PATENT DOCUMENTS 6,414,410 B1     7/2002  Nakamura et al.
12,316,184 B2 *  5/2025  Diebel ..................... H02K 1/20
(Continued)

FOREIGN PATENT DOCUMENTS

JP     2001-069707 A     3/2001
JP     2012-029442 A     2/2012
(Continued)

OTHER PUBLICATIONS

International Search Report with English Translation and Written Opinion dated Mar. 29, 2022 in corresponding International Patent Application No. PCT/JP2022/005934 (8 pages).

*Primary Examiner* — Oluseye Iwarere
*Assistant Examiner* — Minki Chang
(74) *Attorney, Agent, or Firm* — Foley & Lardner LLP

(57) ABSTRACT

A stator for a rotating electric machine includes: a stator core provided with slots arranged in a circumferential direction such that the slots are formed in two or more layers in a radial direction; and coils each having an inserted portion positioned inside the slots, and terminal end portions protruding from one end side and another end side of the stator core in an axial direction; wherein the coils include first coils formed to have a straight-line shape at their terminal end portions, second coils inclined in the circumferential direction at a predetermined angle with respect to an end face of the stator core at the one end side or the other end side of the
(Continued)

(A)          (B)          (C)

terminal end portions, and third coils inclined in the circumferential direction at a predetermined angle with respect to the end face of the stator core at the one end side and the other end side of the terminal end portions, and the first coils, the second coils, and the third coils are connected to each other at their respective end portions to form a multiple winding.

8 Claims, 11 Drawing Sheets

(58) Field of Classification Search
USPC ................................................ 310/179–215
See application file for complete search history.

(56) References Cited

U.S. PATENT DOCUMENTS

| | | | | |
|---|---|---|---|---|
| 2021/0091612 A1* | 3/2021 | Dameron | ................. | H02K 3/28 |
| 2021/0194307 A1* | 6/2021 | Dotz | ..................... | H02K 1/165 |

FOREIGN PATENT DOCUMENTS

| | | |
|---|---|---|
| JP | 2012-029444 A | 2/2012 |
| WO | WO-2018/167853 A1 | 9/2018 |

* cited by examiner (B)

(A)

(B)

(A)

STATOR FOR ROTATING ELECTRIC MACHINE AND ROTATING ELECTRIC MACHINE

TECHNICAL FIELD

The present invention relates to stators for rotating electric machines, and rotating electric machines.

BACKGROUND ART

A stator in a rotating electric machine includes a stator core provided with slots arranged in a circumferential direction, and coils inserted into the slots. The slots arranged in the circumferential direction are further formed in a plurality of layers (layers) in the radial direction. The coils are constituted by rectangular wires each having a rectangular cross-sectional shape. The coils are inserted in the slots and are arranged to form a multiple winding. Further, crossover wires (conductor side portions) connecting the layers adjacent in the radial direction to each other are disposed at the terminal end portions of the coils. In recent years, in rotating electric machines, stators have tended to have larger lengths in the axial direction, due to demands for higher-speed rotations and higher outputs. However, such stators have been desired to be downsized, since the stators are elongated in the axial direction due to the crossover wires disposed at the terminal end portions of coils.

PTL 1 describes an armature for a rotating electric machine, wherein coils are constituted by a plurality of segment conductors, a different-shaped oblique protruding portion includes a first oblique portion, a second oblique portion, and an offset bent portion which radially offsets the second oblique portion with respect to the first oblique portion, and the offset bent portion is formed at the same position as that of any of tooth in the circumferential direction and is formed in such a way to offset the second oblique portion to the same position in the radial direction as that of an oblique protruding portion of a basic segment conductor having a conductor side portion disposed in a layer adjacent in the radial direction to a segment conductor to be coupled to the different-shaped segment conductor.

CITATION LIST

Patent Literature

PTL 1: JP 2012-29444 A

SUMMARY OF INVENTION

Technical Problem

The apparatus in PTL 1 necessitates crossover wires between layers at the terminal end portions of coils, which has made it difficult to downsize the stator in the axial direction.

Solution to Problem

A stator for a rotating electric machine according to the present invention includes: a stator core provided with slots arranged in a circumferential direction such that the slots are formed in two or more layers in a radial direction; and coils having an inserted portion positioned inside the slots, and terminal end portions protruding from one end side and the other end side of the stator core in an axial direction;

wherein the coils include first coils formed to have a straight-line shape at their terminal end portions, second coils inclined in the circumferential direction at a predetermined angle with respect to an end face of the stator core at the one end side or the other end side of the terminal end portions, and third coils inclined in the circumferential direction at a predetermined angle with respect to the end face of the stator core at the one end side and the other end side of the terminal end portions, and the first coils, the second coils, and the third coils are connected to each other at their respective end portions to form a multiple winding.

A rotating electric machine according to the present invention includes the stator for a rotating electric machine, and a rotor faced to the stator with a predetermined gap interposed therebetween and adapted to rotate in the stator.

Advantageous Effects of Invention

According to the present invention, it is possible to eliminate the necessity for crossover wires connecting layers to each other at the terminal end portions of coils, which simplifies the structure, thereby enabling size reduction of the stator in the axial direction.

DESCRIPTION OF EMBODIMENTS

Figure 1:
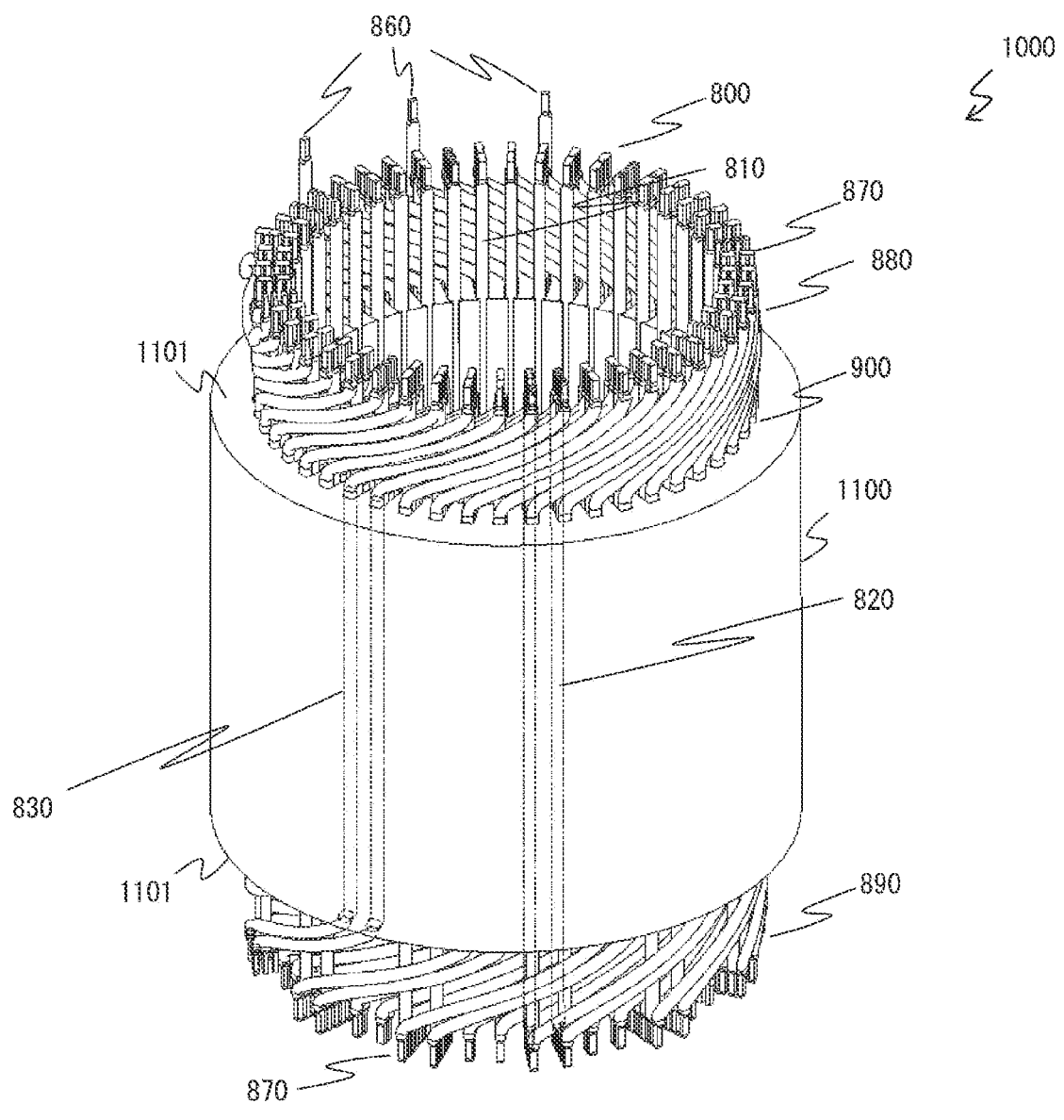
FIG. 1 is an external perspective view of a stator of a rotating electric machine.

Hereinafter, an embodiment of the present invention will be described with reference to the drawings. The following description and drawings are merely examples for explaining the present invention, and omission and simplification are made thereto appropriately for the sake of clarification of explanation. The present invention can be also implemented in other various aspects. Unless otherwise specified, as each constituent component, it is possible to provide one or plural such constituent components.

In the drawings, the position, the size, the shape, the range and the like of each constituent component illustrated therein may not represent its actual position, size, shape, range and the like, in order to facilitate understanding of the invention, in some cases. Therefore, the present invention is not necessarily limited to the positions, sizes, shapes, ranges and the like disclosed in the drawings.

In a case where there are plural constituent components having the same or similar functions, these constituent components may be described by attaching, thereto, the same reference numeral with different subscripts. However, in a case where it is not necessary to distinguish these plural constituent components, these constituent components may be described by omitting such subscripts.

FIG. 1 is an external perspective view of a stator 1000 in a rotating electric machine.

The stator 1000 includes a cylindrical-shaped stator core 1100. In the stator 1000, there is provided a rotor, which is not illustrated. The rotor rotates in the stator 1000 while facing the stator core 1100 with a predetermined gap interposed therebetween. The rotating electric machine is constituted by the rotor which rotates about the center of the cylindrical-shaped stator core 1100, and the stator 1000 which causes the rotor to rotate by a rotating magnetic field.

The stator core 1100 is provided with slots 900 arranged concentrically in the circumferential direction. The slots 900 are holes for inserting coils 800 which will be described later in detail, therethrough in the axial direction. The slots 900 are formed as two or more layers in the radial direction. FIG. 1 illustrates a case where there are four layers of slots 900. In this case, as the layers of slots 900, there are formed four layers in the radial direction, from an innermost diameter layer to an outermost diameter layer. Although the following description will be given by exemplifying a case where the number of layers of slots 900 is four, the number of layers of slots 900 may be, for example, six, eight or the like, and the number of layers is not limited.

The coils 800 are rectangular wires each having a rectangular cross-sectional shape, and are disposed in the slots 900 to be a multiple winding. The coils 800 have an inserted portion positioned inside a slot 900, a drawn side terminal end portion 880 protruding from one end side of the stator core 1100 in the axial direction, and a non-drawn side terminal end portion 890 protruding from the other end side of the stator core 1100 in the axial direction. The coils 800 are connected to each other by soldering or the like at predetermined connection points 870 at the end portions of the respective terminal end portions 880 and 890 to form a multiple winding. Furthermore, coils 800 connected to UVW-phase windings positioned at the drawn side terminal end portions 880 are led out as lead wires 860.

Although details of the coils 800 will be described later, the coils 800 include first coils 810 having a straight-line shape at the terminal end portions 880 and 890, second coils 820 inclined in the circumferential direction at a predetermined angle with respect to an end face 1101 of the stator core 1100 at one end side or the other end side of the terminal end portions 880 and 890, and third coils 830 inclined in the circumferential direction at a predetermined angle with respect to the end face 1101 of the stator core 1100 at one end side and the other end side of the terminal end portions 880 and 890.

First coils 810 and second coils 820 are arranged in the innermost diameter layer, second coils 820 and third coils 830 are arranged in the outermost diameter layer, and second coils 820 are arranged in the other layers. Also, first coils 810 and second coils 820 may be arranged in the outermost diameter layer, second coils 820 and third coils 830 may be arranged in the innermost diameter layer, and second coils 820 may be arranged in the other layers. FIG. 1 illustrates an example where the lead wires 860 are drawn out from third coils 830 arranged in the outermost diameter layer, but lead wires 860 may be also drawn out from first coils 810 or second coils 820 arranged in another layer. Further, AC currents for UVW-phases are supplied to the lead wires 860 from an inverter device, which is not illustrated.

Figure 2:
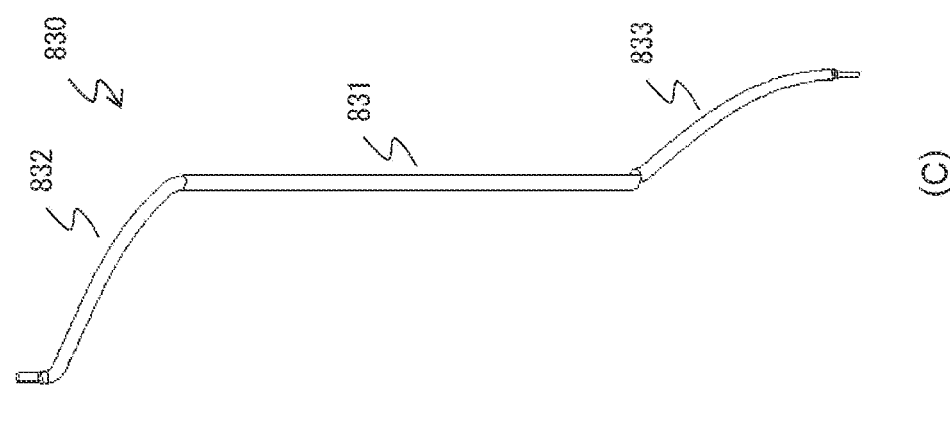
FIGS. 2(A), (B) and (C) are external views of coils.
Figure 2:
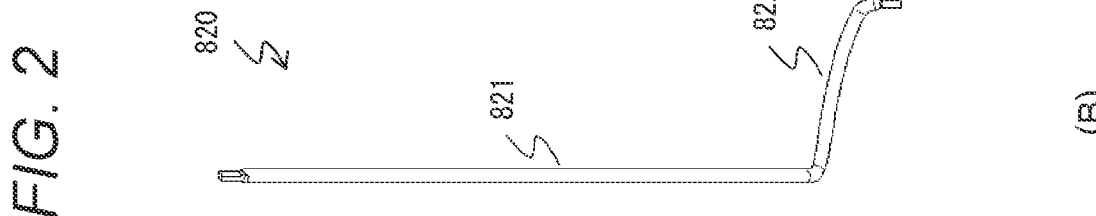
Figure 2:
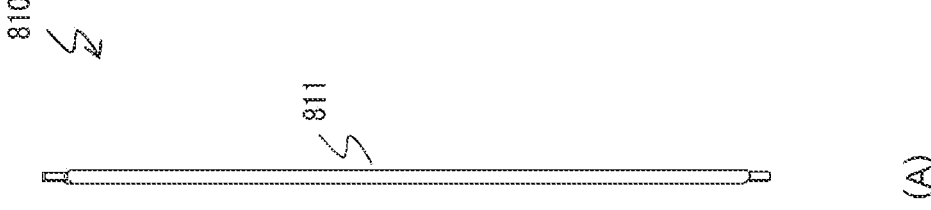

FIGS. 2(A), 2(B), and 2(C) are external views of coils 800. FIG. 2(A) illustrates a first coil 810, FIG. 2(B) illustrates a second coil 820, and FIG. 2(C) illustrates a third coil 830.

As illustrated in FIG. 2(A), the first coil 810 has an I-shape, and is formed to have a straight-line shape from a straight line portion 811. As illustrated in FIG. 2(B), the second coil 820 has an L-shape, and is formed from a straight-line portion 821, and an inclined portion 822 inclined at a predetermined angle with respect to the straight-line portion 821. Further, as one type of a second coil 820, there is a second coil 820' having a bent portion 'a', which will be described later in detail. As illustrated in FIG. 2(C), the third coil 830 has a Z-shape, and is formed from a straight-line portion 831, an inclined portion 832 inclined at a predetermined angle with respect to the straight-line portion 831 at one end side of the straight-line portion 831, and an inclined portion 833 inclined at a predetermined angle with respect to the straight-line portion 831 at the other end side of the straight-line portion 831.

Figure 3:
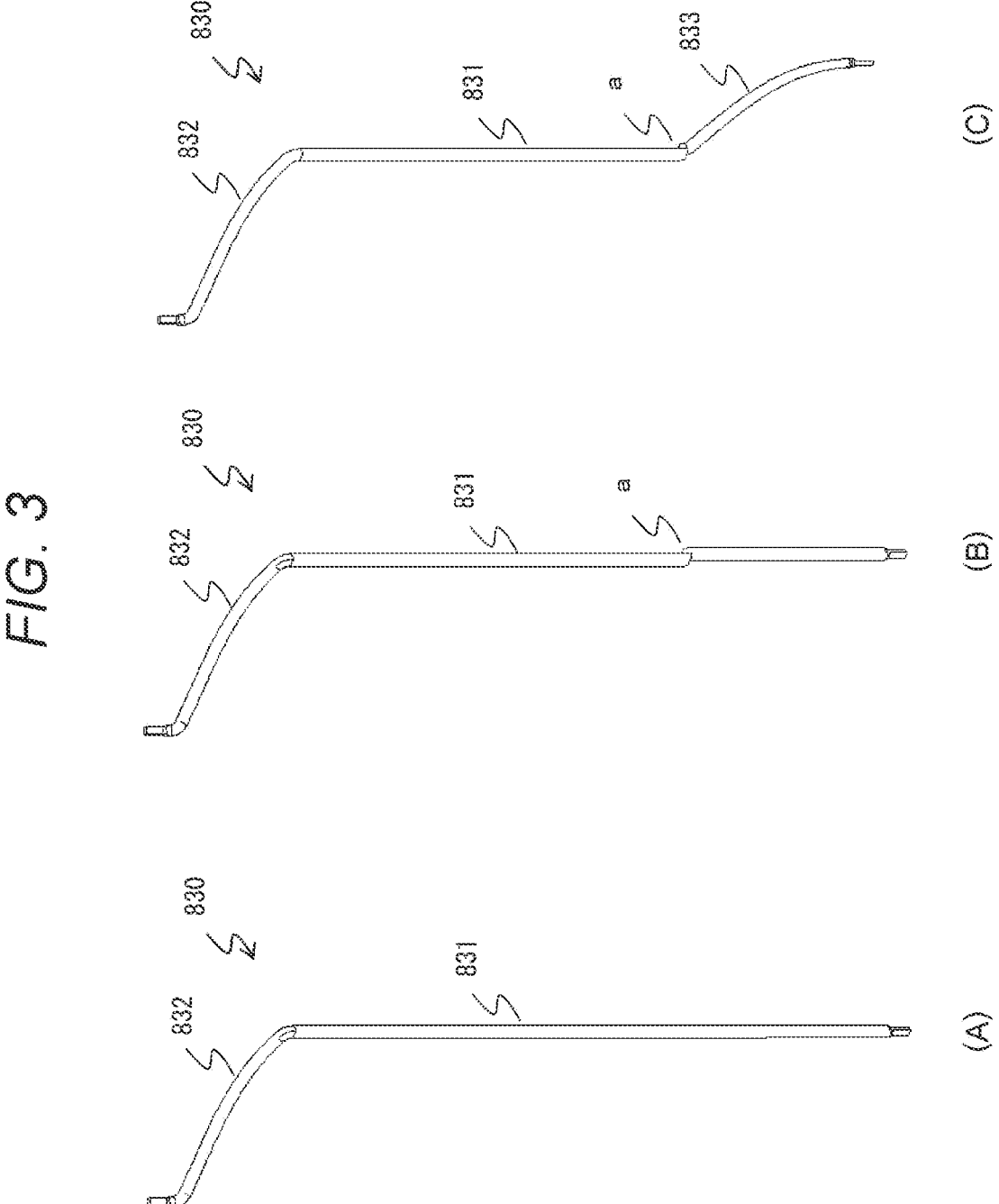
FIGS. 3(A), (B) and (C) are views illustrating processes for forming a third coil.

FIGS. 3(A), 3(B), and 3(C) are views illustrating processes for forming a third coil 830.

Before the third coil 830 is inserted into a slot 900, as illustrated in FIG. 3(A), the third coil 830 includes a straight-line portion 831, and an inclined portion 832 at one end side of the straight-line portion 831. The third coil 830 with this structure is inserted into the slot 900 at the straight-line portion 831 from the other end thereof. Thereafter, as illustrated in FIG. 3(B), the third coil 830 is bent in the radial direction, at a bent portion 'a' at a position exposed from an end face of the stator core 1100, by using a jig which is not illustrated. Regarding the direction of bending, the third coil 830 is bent toward the outer diameter side, in a case where the third coil 830 is disposed in the outermost diameter layer. Thereafter, as illustrated in FIG. 3(C), the third coil 830 is twisted at its other end side from the bent portion 'a' to form an inclined portion 833.

Figure 4:
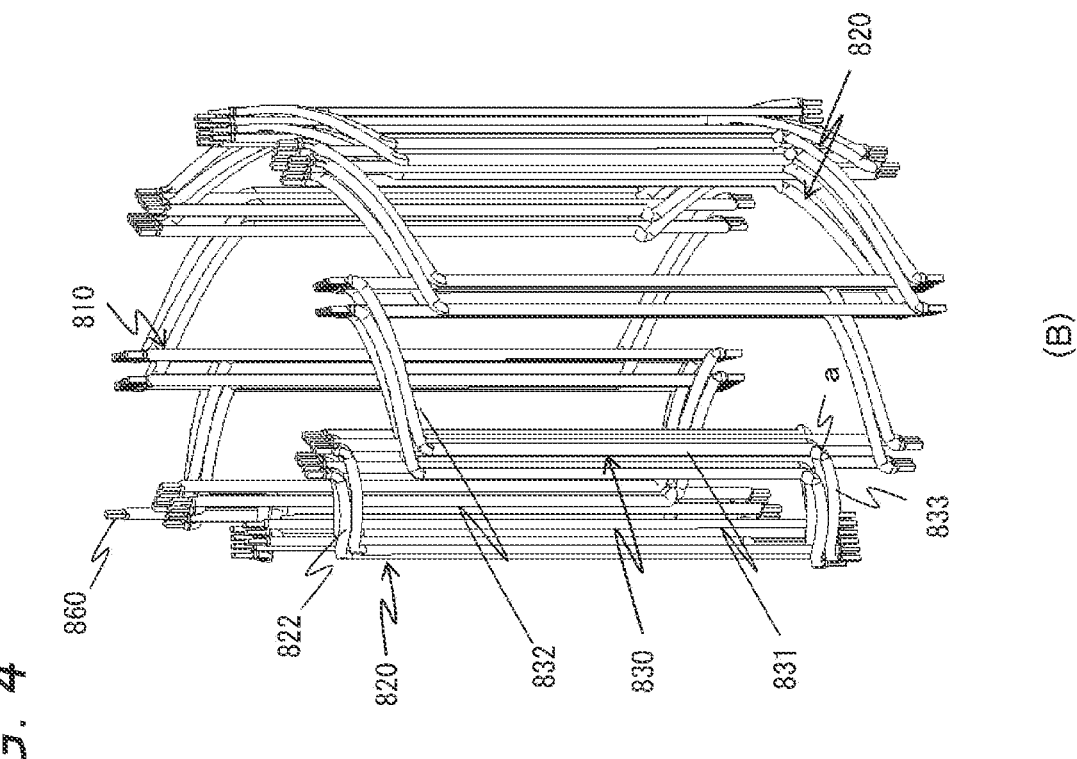
FIGS. 4(A) and (B) are views illustrating a coil structure for one phase which includes third coils wound in a superimposed manner.

FIGS. 4(A) and 4(B) are views illustrating a coil structure for one phase which includes third coils 830 wound in a superimposed manner. FIG. 4(A) illustrates a structure before the third coils 830 are twisted at their other end sides, and FIG. 4(B) illustrates a structure after the third coils 830 have been twisted at their other end sides to form the inclined portions 833.

As described above, second coils 820 and third coils 830 are arranged in the outermost diameter layer. As illustrated in FIG. 4(A), each third coil 830 is twisted at its other end side 'b' from the bent portion 'a', in the circumferential direction 'c' at a predetermined angle. As a result, as illustrated in FIG. 4(B), the third coils 830 are provided with the inclined portions 833. Further, the second coils 820 and the third coils 830 are connected to each other at their end portions. Further, as illustrated in FIG. 4(B), first coils 810 and second coils 820 are arranged in the innermost diameter layer. Further, a lead wire 860 is drawn out from a third coil 830 in the outermost diameter layer.

Figure 5:
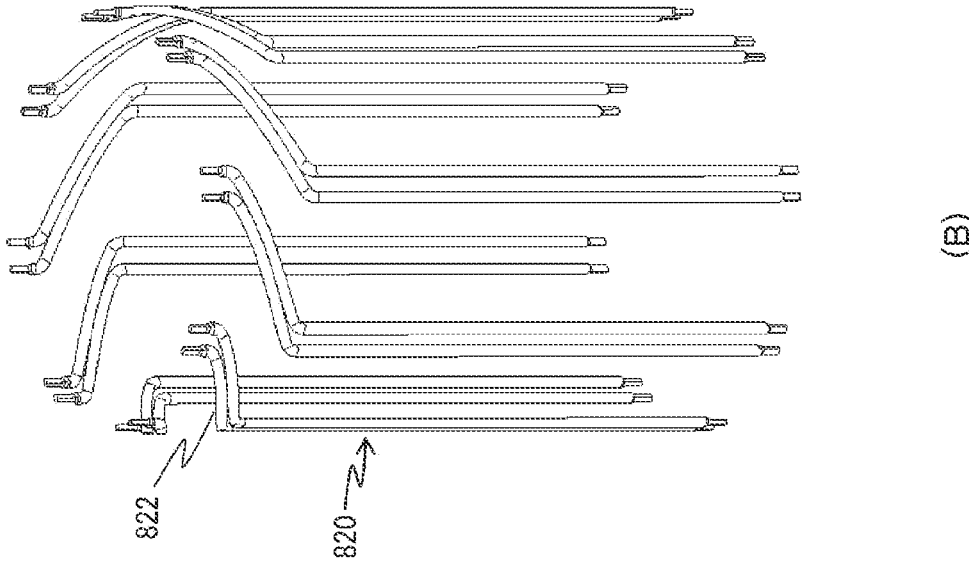
FIGS. 5(A) and (B) are views illustrating coil structures of a first layer and a second layer for a U-phase.
Figure 5:
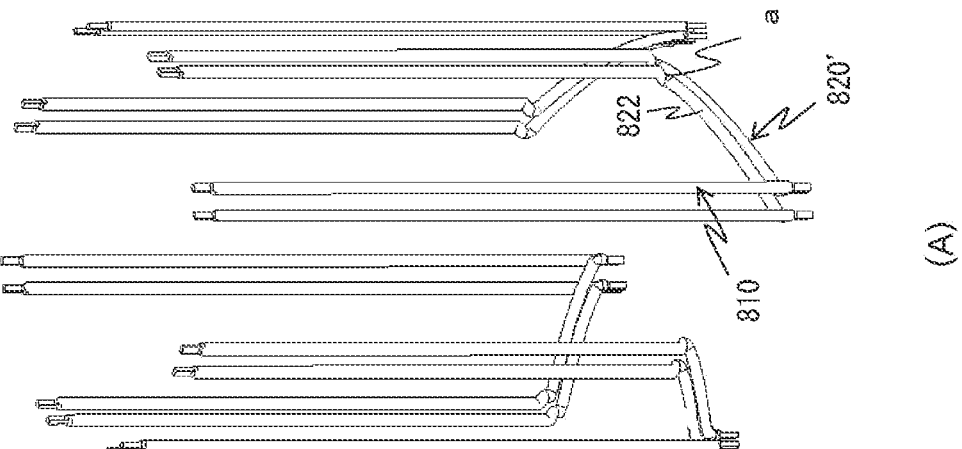

FIGS. 5(A) and 5(B) are views illustrating the coil structures of the first layer and the second layer for a U-phase. FIG. 5(A) illustrates the first layer, and FIG. 5(B) illustrates the second layer. The drawn-out side is illustrated in an upper side of each view, while a non-drawn-out side is illustrated in a lower side of each view.

As illustrated in FIG. 5(A), first coils 810 and second coils 820' are arranged in the first layer (the innermost diameter layer). The second coils 820' have substantially the same structure as that of the second coil 820 illustrated in FIG. 2(B), but the second coils 820' have a bent portion 'a' bent in the radial direction. Regarding the direction of bending, the bent portions are bent toward the inner diameter side, in a case where the second coils 820' are arranged in the first layer. This prevents the inclined portions 822 of the second coils 820' oriented toward the end portions of the first coils 810 from interfering with each other. Further, the first coils 810 and the second coils 820' are connected to each other at their end portions. Further, the first coils 810 and the second coils 820 are inserted into the slots 900 in the first layer in the stator core 1100, at the non-drawn-out side.

As illustrated in FIG. 5(B), second coils 820 are arranged in the second layer. The second coils 820 are inserted into the slots 900 in the second layer in the stator core 1100, at the drawn-out side.

Figure 6:
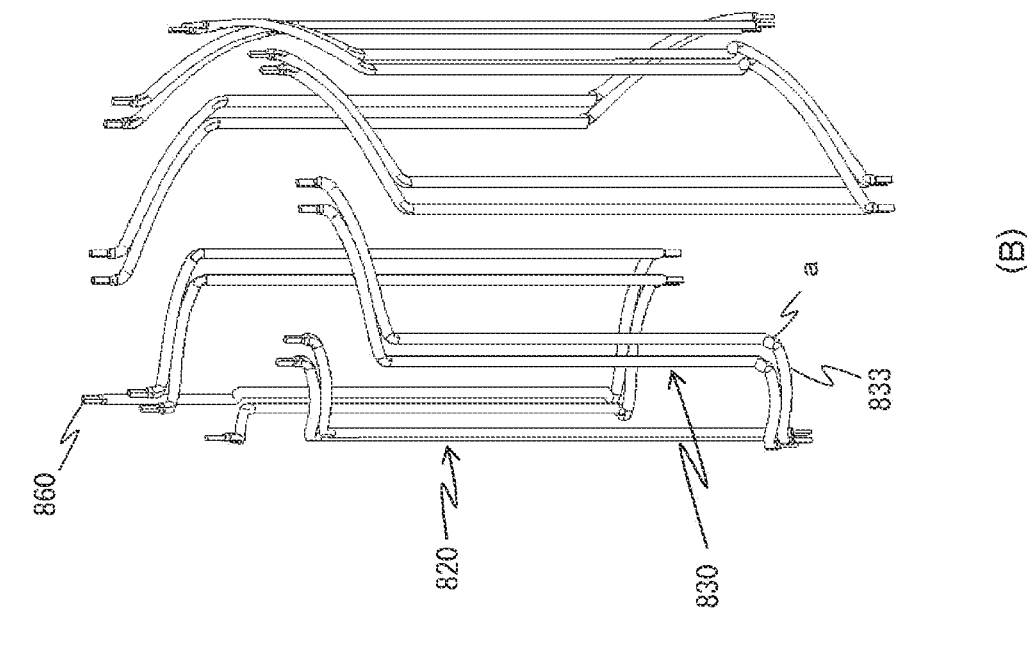
FIGS. 6(A) and (B) are views illustrating coil structures of a third layer and a fourth layer for the U-phase.
Figure 6:
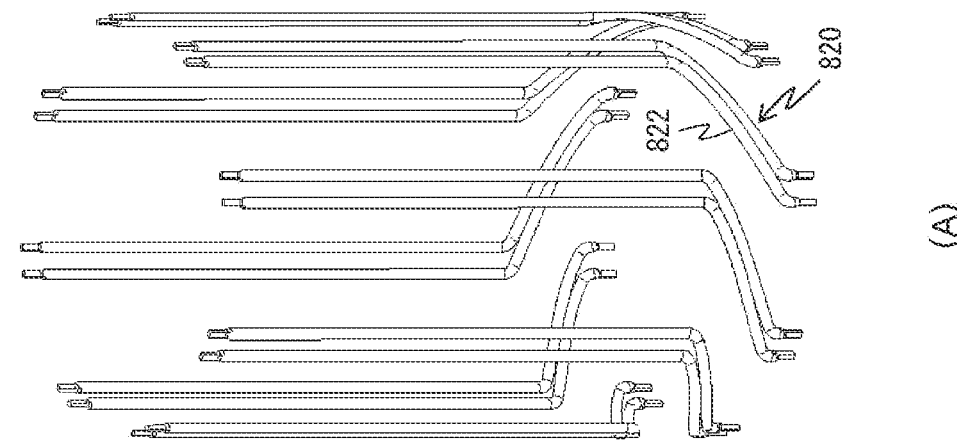

FIGS. 6(A) and 6(B) are views illustrating the coil structures of the third layer and the fourth layer for the U-phase. FIG. 6(A) illustrates the third layer, and FIG. 6(B) illustrates the fourth layer. The drawn-out side is illustrated in an upper side of each view, while a non-drawn-out side is illustrated in a lower side of each view.

As illustrated in FIG. 6(A), second coils 820 are arranged in the third layer. The second coils 820 are inserted into the slots 900 in the third layer in the stator core 1100, at the non-drawn-out side.

As illustrated in FIG. 6(B), second coils 820 and third coils 830' are arranged in the fourth layer (the outermost diameter layer). The second coils 820 and the third coils 830 are inserted into the slots 900 in the fourth layer in the stator core 1100, at the drawn-out side. Thereafter, the third coils 830 are bent in the radial direction at their bent portions 'a'. Regarding the direction of bending, the third coil 830 is bent toward the outer diameter side, in a case where the third coil 830 is disposed in the outermost diameter layer. This prevents the inclined portions 822 of the third coils 830 oriented toward the end portions of the second coils 820 from interfering with each other. Further, the second coils 820 and the third coils 830 are connected to each other at their end portions. A lead wire 860 is drawn out from a third coil 830 having no inclined portion 832 which is arranged in the fourth layer.

Figure 7:
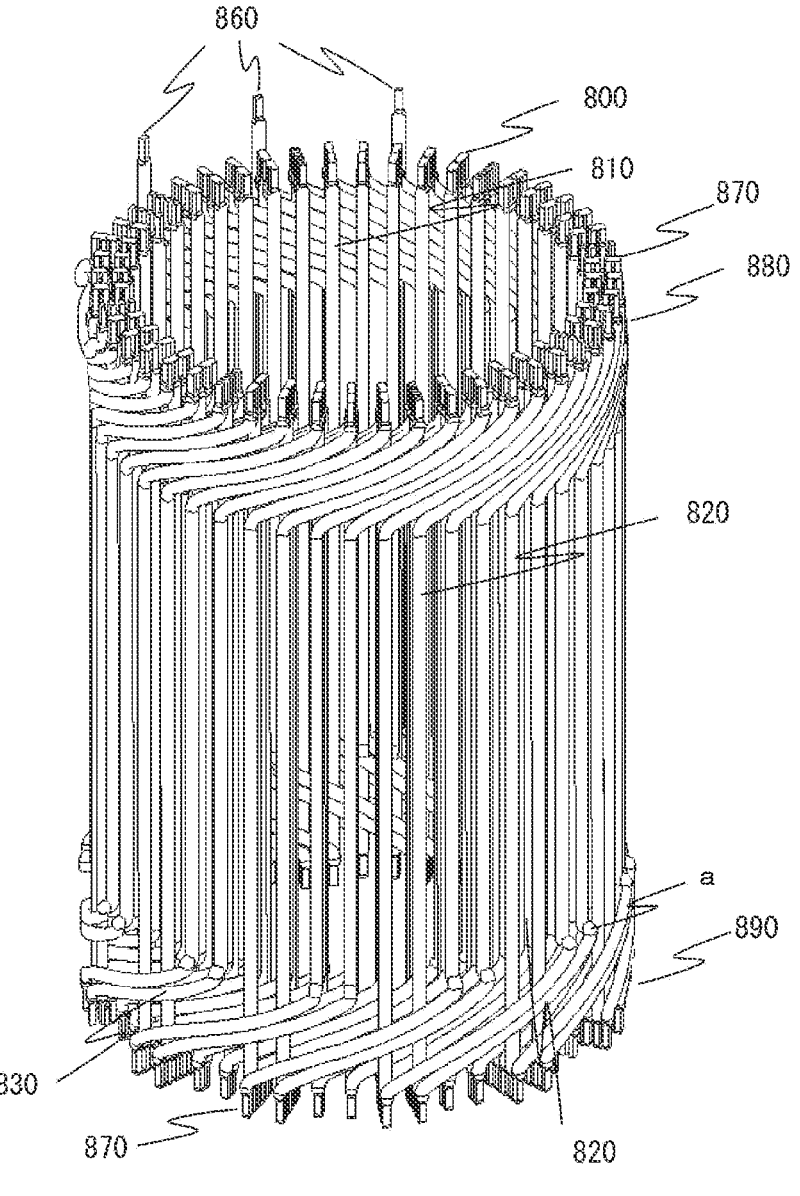
FIG. 7 is a view illustrating the coil structure by transparently illustrating a stator core.

FIG. 7 is a view illustrating the coil structure by transparently illustrating the stator core 1100.

In the first layer (the innermost diameter layer), first coils 810 and second coils 820 are arranged. In the second layer and the third layer, second coils 820 are arranged. In the fourth layer (the outermost diameter layer), second coils 820 and third coils 830 are arranged. The third coils 830 are bent in the radial direction at their bent portions 'a'. Lead wires 860 are drawn out from third coils 830 arranged in the outermost diameter layer.

Predetermined coils 800, out of the coils 800, are connected to each other by soldering or the like at their connection points 870 at their terminal end portions 880 and 890 to form a multiple winding. The connection of the coils 800 may be either star connection or delta connection. Incidentally, the number of slots 900 and the number of coils 800 are merely examples, and the present invention is not limited to these numbers.

Figure 8:
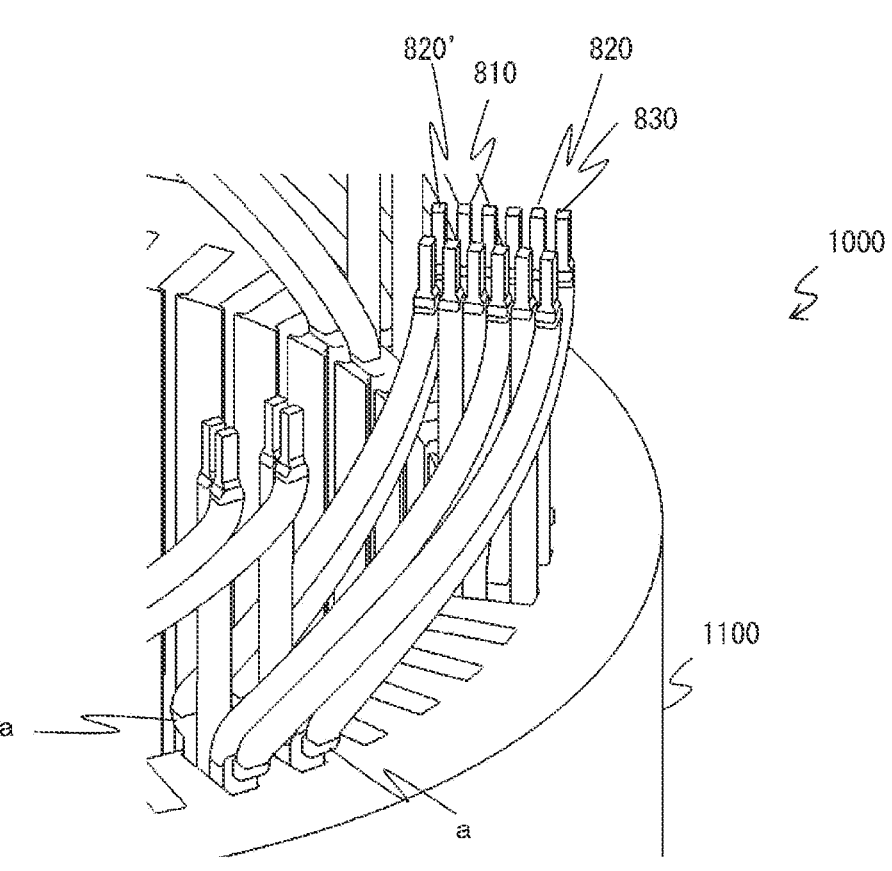
FIG. 8 is an enlarged view of a stator being viewed from a non-drawn-out side.

FIG. 8 is an enlarged view of the stator 1000 being viewed from the non-drawn-out side.

The second coils 820' in the first layer (the innermost diameter layer) are bent toward the inner diameter side in the radial direction at the bent portions 'a'. Further, the second coils 820' are connected to the first coils 810 in the first layer at their end portions. Further, the third coils 830 in the fourth layer (the outermost diameter layer) are bent toward the outer diameter side in the radial direction at their bent portions 'a'. Further, the third coils 830 are connected to the second coils 820 in the fourth layer at their end portions.

Figure 9:
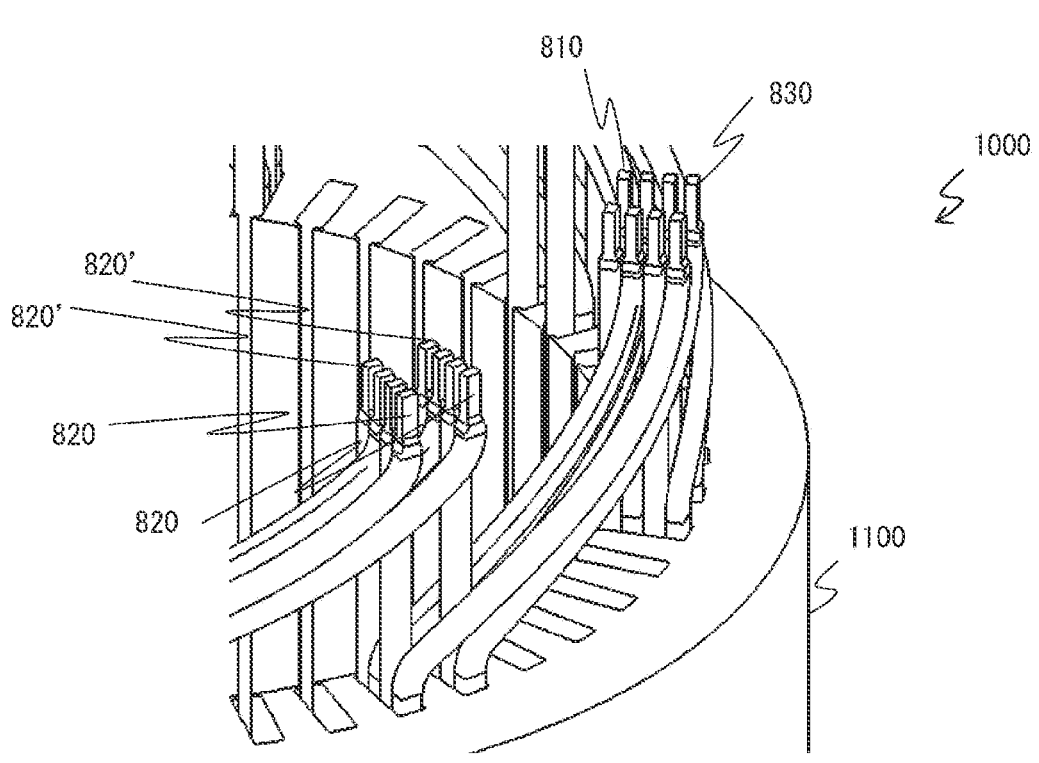
FIG. 9 is an enlarged view of the stator being viewed from a drawn-out side.

FIG. 9 is an enlarged view of the stator 1000 being viewed from the drawn-out side.

In the first layer (the innermost diameter layer), there are arranged the end portions of first coils 810 and second coils 820' having been pressed. Further, in the fourth layer (the outermost diameter layer), there are arranged the end portions of third coils 830 and second coils 820 not having been pressed.

Figure 10:
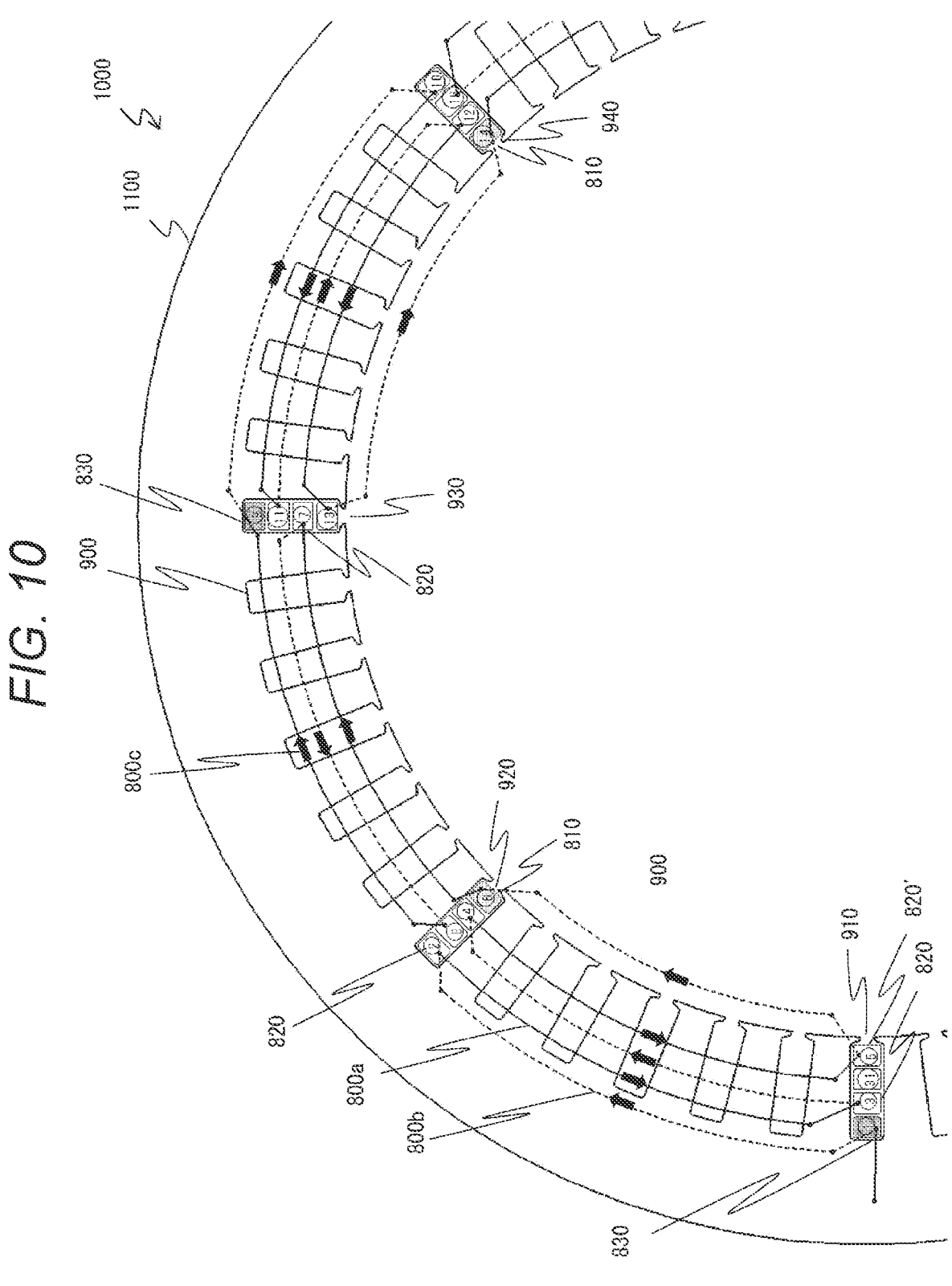
FIG. 10 is a view for explaining the connection of coils.

FIG. 10 is a view for explaining the connection of the coils 800. FIG. 10 illustrates a state of the stator 1000 being viewed at the drawn-out side.

The coils 800, which are constituted by the first coils 810, the second coils 820 and 820', and the third coils 830, are wound through the slots 900 formed in the stator core 1100. The slots 900 are formed to be four layers in the radial direction. In FIG. 10, the slots 900 are illustrated as rectangular holes, and four coils 800 each constituted by a rectangular wire having a rectangular cross-sectional shape are inserted into the slots 900 while being insulated from each other, thereby forming a four-layer structure.

Slots 910, 920, 930, and 940 in FIG. 10 have connection intervals corresponding to 6 slots in the circumferential direction therebetween. The coils 800 for one phase illustrated in FIG. 4 (B) are arranged at the connection intervals. For example, a third coil 830 is arranged in the fourth layer in each of the slots 910 and 930, and a first coil 810 is arranged in the first layer in each of the slots 920 and 940. In FIG. 10, solid lines indicate coils 800a representing the drawn-out side connections. In FIG. 10, broken lines indicate coils 800b representing the non-drawn-out side connections. In FIG. 10, thick arrows indicate the directions of currents through the coils 800a and 800b.

For example, a current flowing through the third coil 830 in the fourth layer in the slot 910 to the non-drawn-out side passes through a coil 800b in the non-drawn-out side, flows through the second coil 820 in the slot 920 to the drawn-out side, and passes through a coil 800a indicated by a solid line. Then, the current flows through the second coil 820 in the third layer to the non-drawn-out side. Further, the current flowing through the non-drawn-out side passes through a coil 800b in the non-drawn-out side, and flows through the second coil 820 in the second layer to the drawn-out side. Then, the current passes through the second coil 820' in the first layer and through a coil 800b in the non-drawn-out side and flows through the first coil 810 in the first layer. At this time, the current shifts from this first coil 810 to the second coil 820 in the second layer, namely, to the connection at the adjacent connection interval.

In general, at the terminal end portions of coils, there are arranged crossover wires (conductor side portions) connecting layers adjacent in the radial direction to each other. This arrangement causes the stator in the rotating electric machine to have a larger length in the axial direction, which has hindered size reduction thereof. In addition, in a case of forming a multiple winding constituted by rectangular wires, coil forming and processing for crossover wires are complicated, which has involved many processes for manufacturing a stator, thereby increasing the manufacturing cost. According to the present embodiment, there is no need for crossover wires connecting layers to each other, which simplifies the structure, thereby enabling size reduction of the stator in the axial direction. In addition, it is possible to reduce the number of manufacturing processes, thereby reducing the manufacturing cost.

Figure 11:
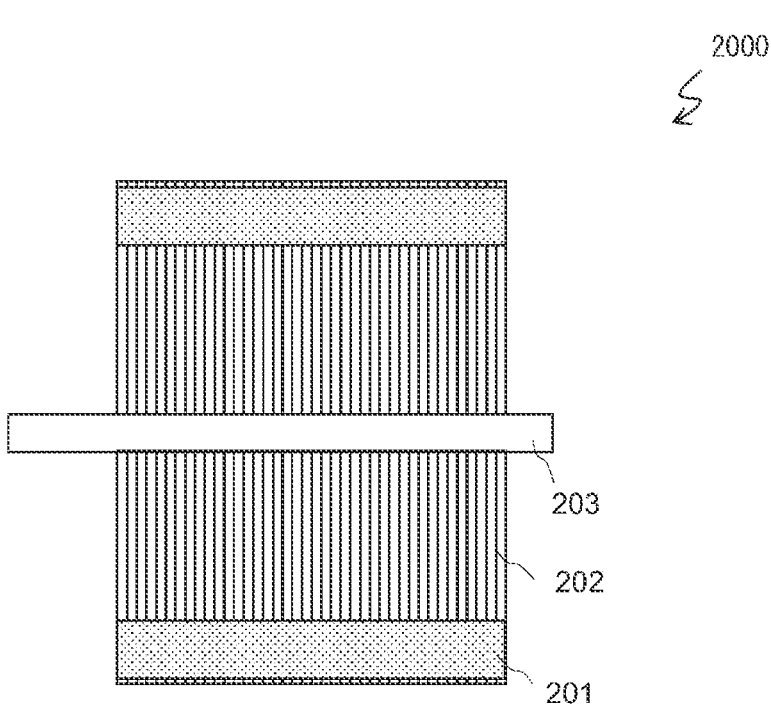
FIG. 11 is an axial cross-sectional view of a rotor.

FIG. 11 is an axial cross-sectional view of the rotor 2000.

The rotor 2000 is provided in the stator 1000 illustrated in FIG. 1, and the rotor 2000 and the stator 1000 constitute the rotating electric machine.

The rotor 2000 is constituted by a laminated-layer steel plate 202 including a permanent magnet 201 embedded therein, and a rotating shaft 203 to which the laminated-layer steel plate 202 is secured. The rotor 2000 is disposed in such a way as to face the stator 1000 with a predetermined gap interposed therebetween. Thus, the rotor 2000 is rotated in the stator 1000 by a rotating magnetic field generated in the coils in the stator 1000.

According to the embodiment described above, the following effects and advantages can be obtained.

(1) The stator 1000 in the rotating electric machine includes: the stator core 1100 provided with the slots 900, 910, 920, 930, and 940 arranged in the circumferential direction such that the slots 900, 910, 920, 930, and 940 are formed in two or more layers in the radial direction; and the coils 800, 800a, and 800b each having the inserted portion positioned inside the slots 900, 910, 920, 930, and 940 and terminal end portion 890 protruding from one end side and the other end side of the stator core 1100 in the axial direction, wherein the coils 800, 800a, 800b, 810, 820, 820' and 830 include: the first coils 810 formed to have a straight-line shape at the terminal end portions 890; the second coils 820 and 820' inclined in the circumferential direction at a predetermined angle with respect to the end face 1101 of the stator core 1100 at the one end side or the other end side of the terminal end portions 890; and the third coils 830 inclined in the circumferential direction at a predetermined angle with respect to the end face 1101 of the stator core 1100 at the one end side and the other end side of the terminal end portions 890, and the first coils 810, the second coils 820 and 820', and the third coils 830 are connected to each other at their respective end portions to form a multiple winding. This eliminates the need for crossover wires connecting the layers to each other at the terminal end portions of the coils, which simplifies the structure, thereby enabling size reduction of the stator in the axial direction.

The present invention is not limited to the aforementioned embodiment, and other aspects conceivable within the scope of the technical idea of the present invention are also included within the scope of the present invention as long as such other aspects do not impair the features of the present invention.

REFERENCE SIGNS LIST 201 permanent magnet
202 laminated-layer steel sheet
203 rotating shaft
800, 800a, 800b coil
810 first coil
820, 820' second coil
830 third coil
811, 821, 831 straight-line portion
822, 832, 833 inclined portion 860 lead wire
870 connection point
880, 890 terminal end portion
900, 910, 920, 930, 940 slot
1000 stator
1100 stator core
1101 end face of stator core
2000 rotor
a bent portion

The invention claimed is:

1. A stator comprising:
a stator core provided with slots arranged in a circumferential direction such that the slots are formed in two or more layers in a radial direction; and
coils each having an inserted portion positioned inside the slots, and terminal end portions protruding from one end side and another end side of the stator core in an axial direction, wherein
the coils include a first coil formed to have a straight-line shape at its terminal end portions, a second coil inclined in the circumferential direction at a predetermined angle with respect to an end face of the stator core at the one end side or the other end side of its terminal end portions, and a third coil inclined in the circumferential direction at a predetermined angle with respect to the end face of the stator core at the one end side and the other end side of its terminal end portions, and
the first coil, the second coil, and the third coil are connected to each other at their respective end portions to form a multiple winding.

2. The stator of claim 1, wherein
the layers comprise at least four layers, and
the first coil and the second coil are arranged in an innermost diameter layer out of the layers.

3. The stator of claim 2, wherein the second coil arranged in the innermost diameter layer includes a bent portion bent toward an inner diameter side in the radial direction in its terminal end portion.

4. The stator of claim 2, wherein the second coil and the third coil are arranged in an outermost diameter layer out of the layers.

5. The stator of claim 4, wherein the third coil arranged in the outermost diameter layer includes a bent portion bent toward an outer diameter side in the radial direction in its terminal end portion.

6. The stator of claim 4, wherein a lead wire to be connected to an external apparatus is drawn out from the terminal end portions of some of the third coils arranged in the outermost diameter layer.

7. The stator of claim 4, wherein the second coil is arranged in other layers than the innermost diameter layer and the outermost diameter layer out of the layers.

8. A rotating electric machine comprising:
the stator of claim 1; and
a rotor faced to the stator with a predetermined gap interposed therebetween and adapted to rotate in the stator.

* * * * *